(12) United States Patent
Davis, Jr.

(10) Patent No.: US 7,744,756 B2
(45) Date of Patent: Jun. 29, 2010

(54) WASTEWATER FLOW DIVERTER

(75) Inventor: John R. Davis, Jr., Youngsville, NC (US)

(73) Assignee: Soil Horizons, Inc., Youngsville, NC (US)

( * ) Notice: Subject to any disclaimer, the term of this patent is extended or adjusted under 35 U.S.C. 154(b) by 29 days.

(21) Appl. No.: 12/169,289

(22) Filed: Jul. 8, 2008

(65) Prior Publication Data

US 2010/0006489 A1 Jan. 14, 2010

(51) Int. Cl.
*C02F 3/00* (2006.01)
(52) U.S. Cl. ............... 210/170.08; 405/41; 405/43; 405/47; 405/51
(58) Field of Classification Search ............ 210/170.08, 210/532.2; 405/36, 40, 41, 43, 45, 47, 51
See application file for complete search history.

(56) References Cited

U.S. PATENT DOCUMENTS

| | | | |
|---|---|---|---|
| 844,451 A | 2/1907 | Helber | |
| 956,665 A * | 5/1910 | Ashley | 210/170.08 |
| 1,795,123 A | 3/1931 | Harris | |
| 3,156,490 A * | 11/1964 | Myll | 405/51 |
| 3,562,969 A | 2/1971 | Little, Jr. | |
| 3,826,376 A | 7/1974 | Carlson et al. | |
| 4,136,010 A | 1/1979 | Pilie et al. | |
| 4,298,470 A | 11/1981 | Stallings | |
| 4,303,350 A * | 12/1981 | Dix | 405/36 |
| 4,345,998 A | 8/1982 | Graffis et al. | |
| 4,663,036 A | 5/1987 | Strobl, Jr. et al. | |
| 4,756,827 A | 7/1988 | Mayer | |
| 4,838,731 A | 6/1989 | Gavin | |
| 4,872,575 A * | 10/1989 | Kobilan | 220/3.3 |
| 5,161,912 A * | 11/1992 | Schlueter et al. | 405/39 |
| 5,322,387 A | 6/1994 | Heine et al. | |
| 5,617,679 A | 4/1997 | Meyers | |
| 5,772,361 A | 6/1998 | Gavin | |
| 6,112,766 A * | 9/2000 | Zoeller et al. | 405/51 |
| 6,290,429 B1 * | 9/2001 | Presby | 405/45 |
| 6,419,421 B1 | 7/2002 | Whitfield, Jr. | |
| 6,503,392 B1 | 1/2003 | Tyson | |
| 6,772,789 B1 | 8/2004 | Terry, III et al. | |
| 6,932,099 B2 * | 8/2005 | Mahaney | 405/36 |
| 6,997,203 B2 | 2/2006 | Tsigonis | |
| 7,021,672 B2 | 4/2006 | Ericksen et al. | |
| 7,022,222 B2 * | 4/2006 | Jowett | 210/170.08 |
| 7,273,330 B1 * | 9/2007 | Brochu et al. | 405/43 |
| 2004/0184884 A1 * | 9/2004 | DiTullio | 405/43 |

* cited by examiner

*Primary Examiner*—Christopher Upton
(74) *Attorney, Agent, or Firm*—Womble Carlyle Sandridge & Rice, PLLC

(57) ABSTRACT

An apparatus for diverting wastewater in septic system comprises a top, a side adjoining and extending downwardly from the top, the top and the side form an inner volume and a partially open bottom. The bottom can be fully open. A first opening extends upwardly from the partially open bottom. A second opening, having a perimeter, is also on the side. The apparatus can be placed at outlet end of a trench to receive the trench pipe. The first opening, the open bottom and the inner volume permit the apparatus to be placed over a pipe without adjustments or modifications.

16 Claims, 7 Drawing Sheets

WASTEWATER FLOW DIVERTER

FIELD OF INVENTION

The invention is directed to a wastewater flow diverter for a septic system.

BACKGROUND

A well designed septic system will meet several basic requirements. First, the system will effectively collect, treat and transport wastewater throughout a drainfield. Second, the septic system will be simple to install and its components designed to reduce or eliminate installer error. Finally, a septic system will be easy to maintain. Poor design, improper installation and inadequate maintenance contribute to, or cause, poor drainage, blockages, or inefficient treatment of waste from a dwelling. Properly designed septic systems therefore integrate required performance attributes (i.e. collection, treatment and distribution of waste) with easy installation and a mechanism to simplify maintenance.

Several attempts have been made to accomplish such an integration. Particular attention has been given to the distribution of wastewater over a drainfield. Two systems that are available to distribute wastewater over a drainfield are equal distribution and serial distribution. An equal distribution system equally divides wastewater from a septic tank through a distribution box to several absorption trenches located in the drainfield. In a serial distribution system, wastewater travels through a series of linked absorption trenches in a sequential manner. Serial distribution systems are often used where the elevation of a septic tank is higher than the drainfield. Because wastewater travels sequentially through a serial distribution system, the linkages between two given trenches are important to the efficient operation of the septic system.

Conventional approaches linking two subsequent trenches in a serial distribution system are "step-down" and "drop-boxes." The step-down can have three parts: an inlet, an elbow junction and a discharge arranged so that the elbow junction is elevated higher in the trench than either the inlet or discharge. This arrangement requires an upward incline leading up to the elbow junction of the step-down. In normal operation of step-down wastewater can accumulate in a trench pipe and flow upwards through the inlet, over the elbow junction, and through the discharge towards the next trench. When a step-down is improperly installed, or when the inlet and/or the elbow junction contains blockage, wastewater can flow backwards in the trench pipe causing undesirable backfill. A step-down is a closed system requiring precise linkages between the inlet, elbow junction and discharge. A "drop-box" can be a closed structure with an access lid, an inlet, outlets positioned close to the bottom of the drop-box, and an overflow outlet positioned close to the top. Wastewater enters the drop box and, after wastewater accumulates to rise to the height of the overflow outlets, is distributed to one or several subsequent trenches. Step-downs typically are constructed at the septic site, making proper installation imperative.

If installed improperly, both the step-down and drop-box can lead to malfunctions in the subsequent trenches. For step-downs, the possibility exists that the elbow junction will not properly accommodate for elevation changes between the two trenches. Less than precise measuring, cutting and fitting can lead to blockages and possible back-fill. When this occurs, the land owner or installer may incur substantial repair or replacements costs. Drop-boxes are typically prefabricated prior to installation and can unfortunately be easily installed backwards. For example, a pipe from a septic tank can be accidentally inserted into the overflow outlet of the drop-box. When water has accumulated the trenches, the wastewater will exit the overflow outlet first and causing undesirable backfill into the septic tank. Thus, improperly installed drop-boxes lead to back fill and blockages thus inhibiting the discharge of wastewater from the septic tank. Even when properly installed, both step-down and drop-box systems are subject to fatigue and excessive loads leading to ruptures or breaks. These breaks may disrupt wastewater flow and the delicate balance of a septic system. These attempts have failed to serve the primary goals of septic tank systems, i.e., to efficiently collect, treat and dispose of wastewater and to provided ease of maintenance and repair. The invention, however, efficiently collects and distributes wastewater in a septic system and can replace the step-down and drop-boxes currently used.

DESCRIPTION

Certain exemplary embodiments of the present invention are described below and illustrated in the accompanying Figures. The embodiments described are only for purposes of illustrating embodiments of the present invention and should not be interpreted as limiting the scope of the invention. Other embodiments of the invention, and certain modifications and improvements of the described embodiments, will occur to those of skill in the art, and all such alternate embodiments, modifications and improvements are within the scope of the present invention.

Figure 1A:
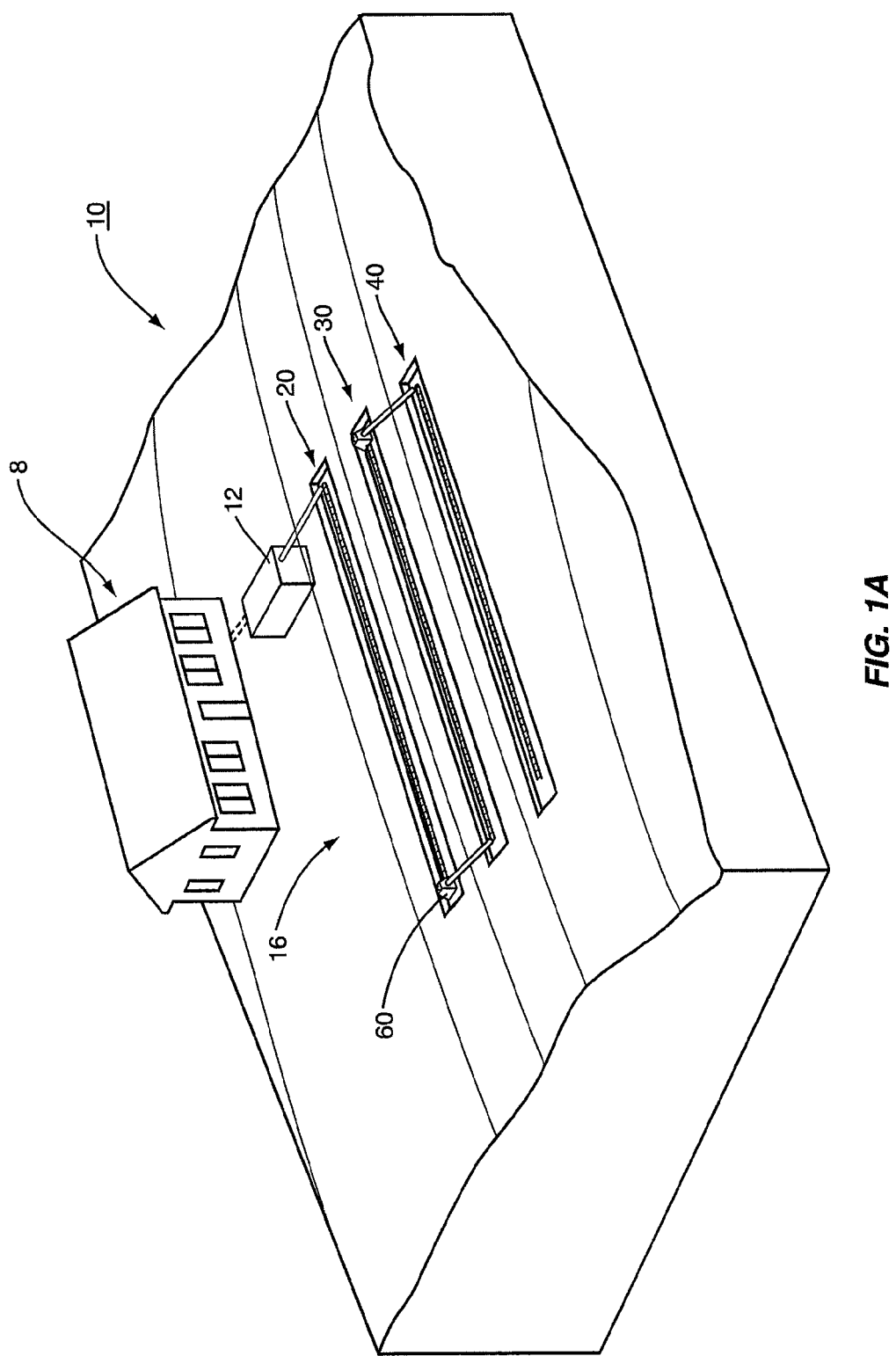
FIG. 1A is an environmental view of a residential septic system using wastewater flow diverters in a serial distribution system.
Figure 1B:
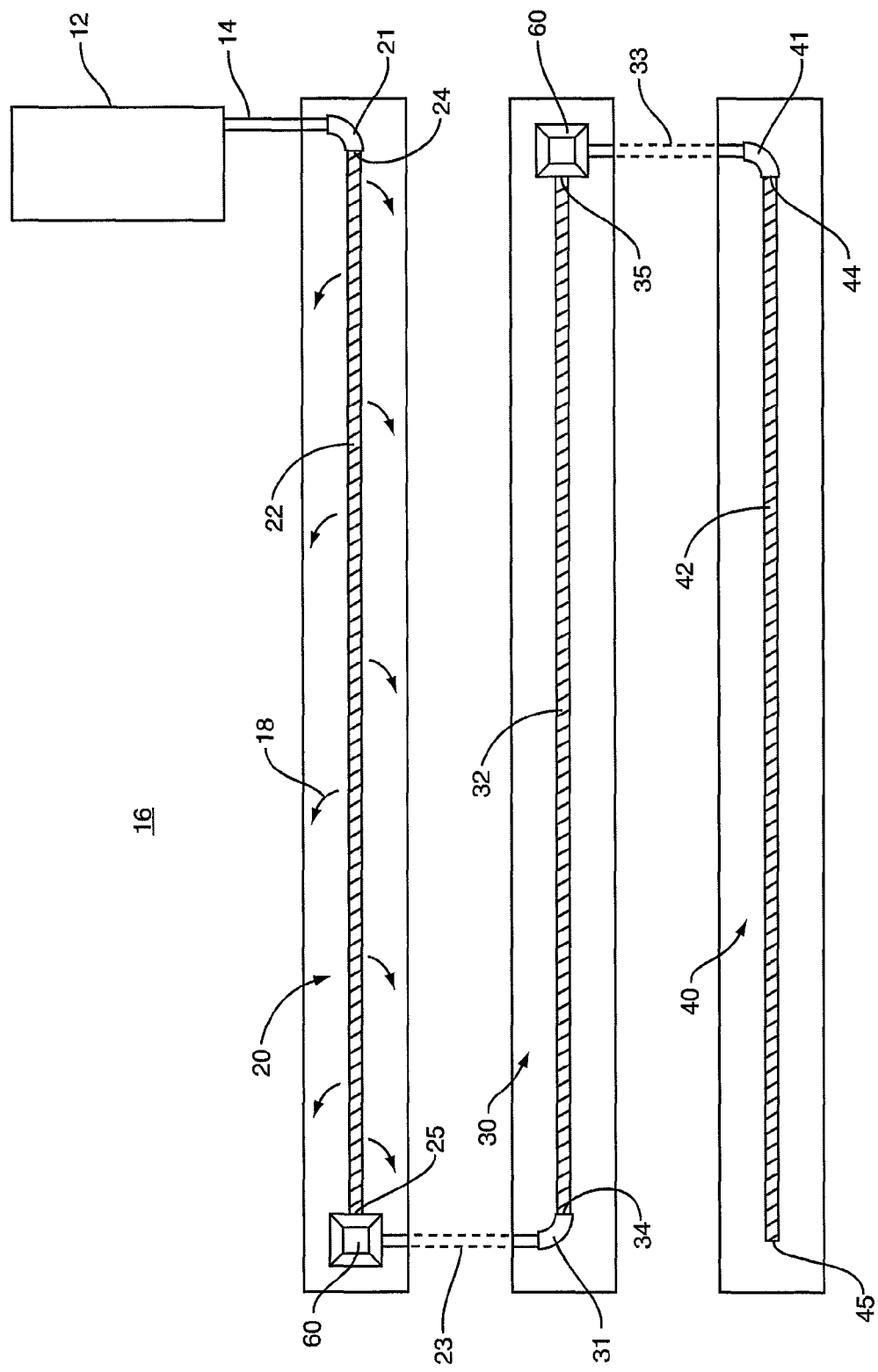
FIG. 1B shows a top view of a septic system using wastewater flow diverters in a serial distribution system.

Referring to FIGS. 1A and 1B, a septic system 10 of one embodiment employs a wastewater flow diverter 60 in a serial distribution system over a downwardly sloping landform is shown. The septic tank 12 collects influent from the plumbing system of a dwelling 8. In a typical septic system 10, influent will stay in the septic tank 12 for 2 to 3 days, where the solids will settle and undergo anaerobic treatment as is well known in the art. As influent enters a septic tank 12 wastewater 18 will rise and discharge into an adjacent drainfield 16 through a septic tank pipe 14.

While a downwardly sloping landform is shown, the invention also includes an embodiment where serial trenches are dug at successively lower elevations to permit a gravity feed septic system, regardless of the actual slope of the upper terrain. In addition, the invention includes an embodiment where the wastewater 18 flows through a positive feed (e.g. pump) as opposed to gravity feed.

FIG. 1B shows a drainfield 16 having a first 20, second 30, and third 40 trenches arranged in series over a sloping landform linked by two wastewater flow diverters. In an alternate embodiment, a landform may have a minimal slope, each trench successively deeper than the prior trench. A drainfield 16 typically is the portion of a septic system 10 comprising the trenches and soil surrounding each trench through which wastewater 18 will permeate. In the embodiment shown in FIGS. 1A and 1B, each trench distributes some wastewater 18 to the surrounding soil and conveys some wastewater 18 to a subsequent trench, if any. While FIG. 1 shows three trenches 20, 30 and 40, the inventors contemplate a septic system 10 having two or more trenches. For example, the septic system 10 may have two, three, four, five or more trenches. Each trench can be linked to the subsequent trench in the series by a wastewater flow diverter 60.

Figure 2A:
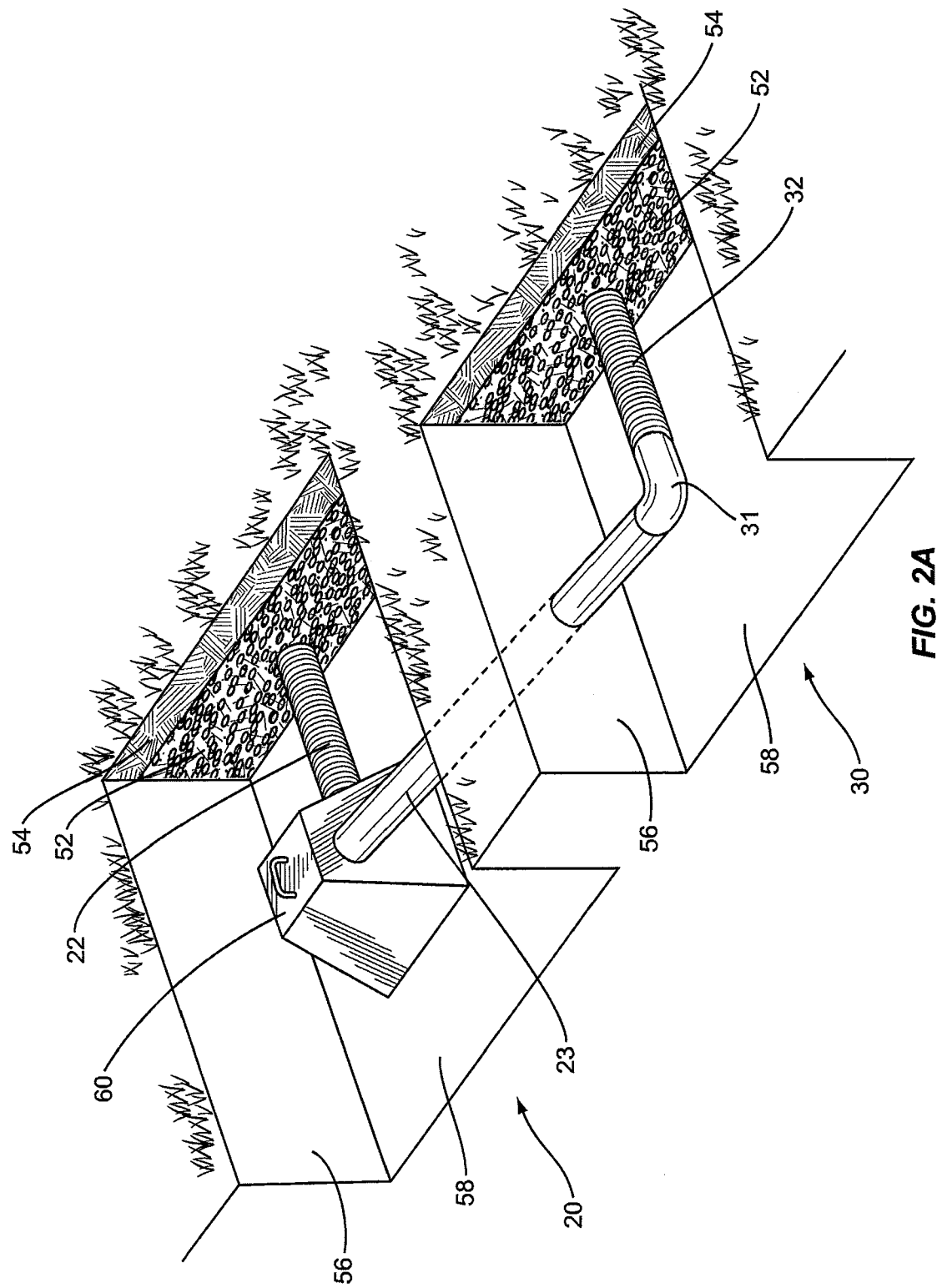
FIG. 2A shows a wastewater flow diverter linking two trenches in a serial distribution system.
Figure 2B:
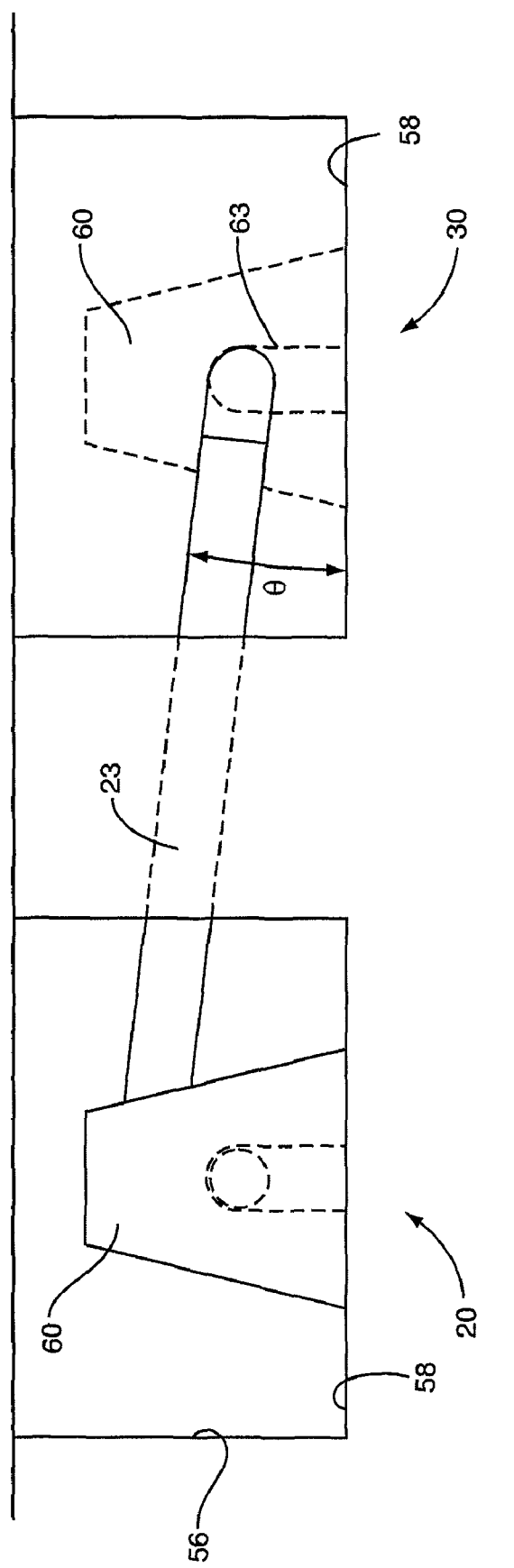
FIG. 2B is a side view of FIG. 2A showing a wastewater flow diverter linking two trenches in serial distribution system.
Figure 3:
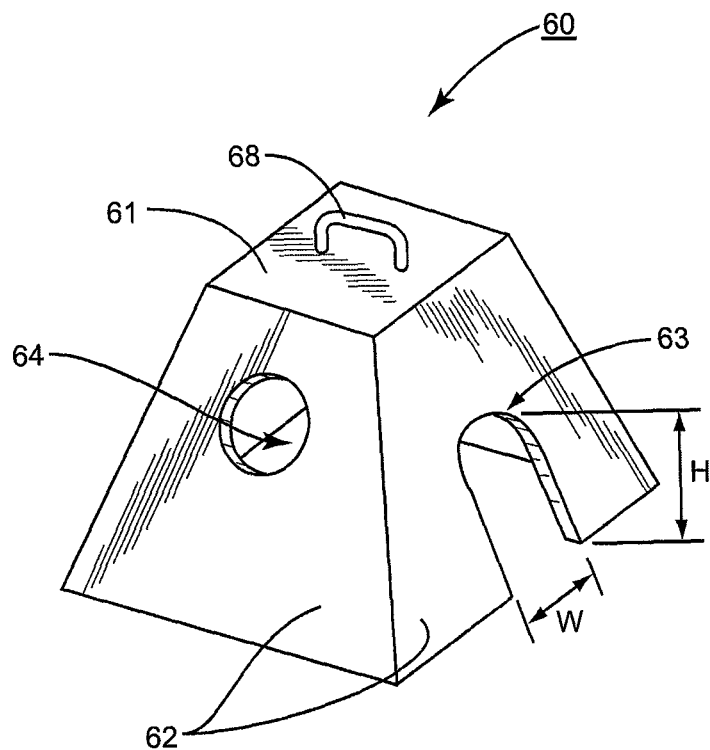
FIG. 3 is a top perspective view of a wastewater flow diverter.
Figure 4:
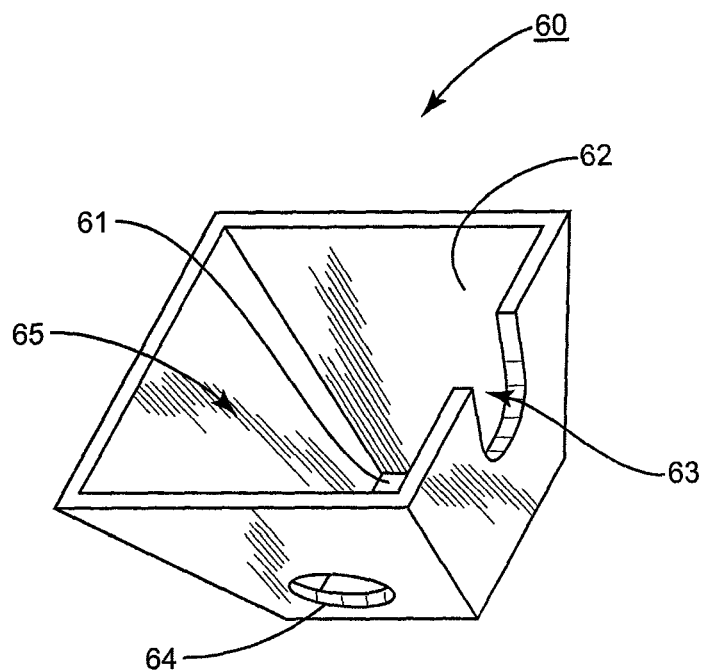
FIG. 4 is a bottom perspective view of a wastewater flow diverter.

Referring to FIGS. 1B and 2A, each trench can have common elements. For example, the first trench 20 may have a first trench pipe 22, an inlet end 24 and an outlet end 25. A first trench 20 may comprise aggregate 52, fill dirt 54, all bounded by side soil 56 and bottom soil 58. Aggregate 52 can completely surround a first trench pipe 22. Fill dirt 54 can be added on top of the aggregate 52 up to the surface of the drainfield 16. (In FIG. 2A, the first trench pipe 22 and wastewater flow diverter 60 is shown in a cut-away, where the portion of aggregate 52 and fill dirt 54 is removed for ease of illustration). Accordingly, a second trench 30 can have a second trench pipe 32, an inlet end 34 and an outlet end 35. A second trench 30 may have aggregate 52, fill dirt 45, all bounded by side soil 56 and bottom soil 58. Linking two sequential trenches can be a wastewater flow diverter 60, which directs wastewater 18 from an outlet end 25 of a first trench 20 to an inlet end 24 of a second trench 30 through a first transport pipe 23 (as shown in FIG. 2B).

A first trench pipe 22 allows wastewater 18 to seep downwardly toward the bottom soil 58 and through the first trench 20 into a wastewater flow diverter 60. A first trench pipe 22 may be a corrugated, perforated pipe such as ADS 0401-0050 available from Advanced Drainage Systems, Inc of Hilliard, Ohio. In an alternate embodiment, a first trench pipe 22 may be an EZ Flow® tube, available from Ring Industrial Group, L.P. of Oakland, Tenn. In either embodiment, wastewater 18 may trickle through a first trench pipe 22 into the soil beneath a first trench 20. Escaping wastewater 18 can saturate the soil and a biomat can be formed along the bottom of the first trench 20. When the wastewater 18 enters a first trench 20 faster than wastewater 18 is absorbed in to the soil, wastewater 18 can begin to pond or collect in a first trench 20. Wastewater can then rise or accumulate in wastewater flow diverter 60 located at the outlet end 25 of a first trench 20 as is known in the art. As wastewater 18 accumulates in a wastewater flow diverter 60, wastewater 18 can be directed (as described below) through a first transport pipe 23 and flow in to a second trench 30. For gravity-fed systems, the grade need be sufficient to allow wastewater 18 to flow downgrade to the next trench. For example, the grade between two trenches can be as small as 2.0-%. In an alternative embodiment, the grade between two trenches may be flat, i.e. 0-%, however, the grade, or angle (θ) of first transport pipe 23 can be at least about 2.0-%. The angle (θ) of first transport pipe 23 can be measured with respect to the bottom soil 58 as shown in FIG. 2A.

A first transport pipe 23 can be a solid cylindrical tube having a first end and second end. A 3-in. or 4-in. diameter, schedule 40, PVC pipe can be used as a first or second transport pipe 33. A first transport pipe 23 (or a second 33 and third 43) can be any conveyance structure such as a tube, pipe, canal, channel, duct or passage for conveying wastewater 18.

A second trench 30 may be similar in its operation to a first trench 20. Wastewater 18 from a first trench 20 enters a second trench pipe 32 and seeps in to the soil surrounding a second trench 30. As wastewater 18 enters the second trench 30, the soil will eventually saturate due to escaping wastewater 18 and a biomat may form thus ponding wastewater in a second trench 30. A wastewater flow diverter 60 may then redirect accumulated wastewater 18 (as described below) from a second trench 30 to a third 40, or in the embodiment shown, terminal trench through a second transport pipe 33. This process can be repeated for each subsequent trench installed in a septic system 10, or for each trench added to a pre-existing septic system.

Finally, one aspect of the invention is the wastewater flow diverter 60. As described above, a wastewater flow diverter 60 conveys accumulated wastewater 18 from a prior trench to a subsequent trench through a first transport pipe 23. Referring to FIGS. 3, 4, 5A and 5B a wastewater flow diverter 60 may comprise a top 61 and a side 62. A side 62 can refer to a wall, adjoining but extending downwardly from a top 61 toward the bottom of a wastewater flow diverter 60. The top 61 can be planar and substantially parallel to the bottom soil 58 as positioned in a first trench 20. The top 61 and side can have a partially or completely open bottom 65 that forms an inner volume. If the bottom is completely open, the top 61 and side define the inner volume. The side can include four side walls of a cube, cubiod, or a frustopyramid. Alternatively, the side could include the entire side wall of a frustocone or a cylinder. The embodiment shown in FIGS. 3 and 4 has four sides 62 forming a frustopyramid. A wastewater flow diverter 60 can also be a single unitary structure. A wastewater flow diverter 60 can also be formed from separate pieces that are positioned together to such that an inner volume is formed. For example, the top 61 and side 62 can be independently formed and later positioned to form an inner volume.

A wastewater flow diverter 60 can have a first opening 63, a second opening 64 and an open bottom 65. A first opening 63 can extend upwardly from an open bottom 65. A first opening 63 can serve as an inlet for wastewater 18 to enter a wastewater flow diverter 60 and receives a first trench pipe 22 from the outlet end 25 of a first trench 20 in a septic system 10. As shown on FIGS. 3 and 4, the first opening 63 can be sized to receive a first trench pipe 22. For example, the vertical height (H) of the first opening 63 can vary according to the type of trench pipe it may receive. The first opening 63 may have a vertical height (H), measured from the base of the wastewater flow diverter 60, which is greater than the size of a first trench pipe 22. In another embodiment the width (W) of a first opening 63 can be greater than the diameter of $D_1$ of a first trench pipe 22. Where an EZ Flow® tube, with an approximate inner diameter of about 4 inches is used as a first trench pipe 22 as described above, the height (H) of the first opening 63 measured from the base of a wastewater flow diverter 60 can be at least about 8 inches. A first opening 63 can be designed to receive any conveyance structure such as a tube, pipe, channel, duct or passage for conveying wastewater 18.

Figure 5A:
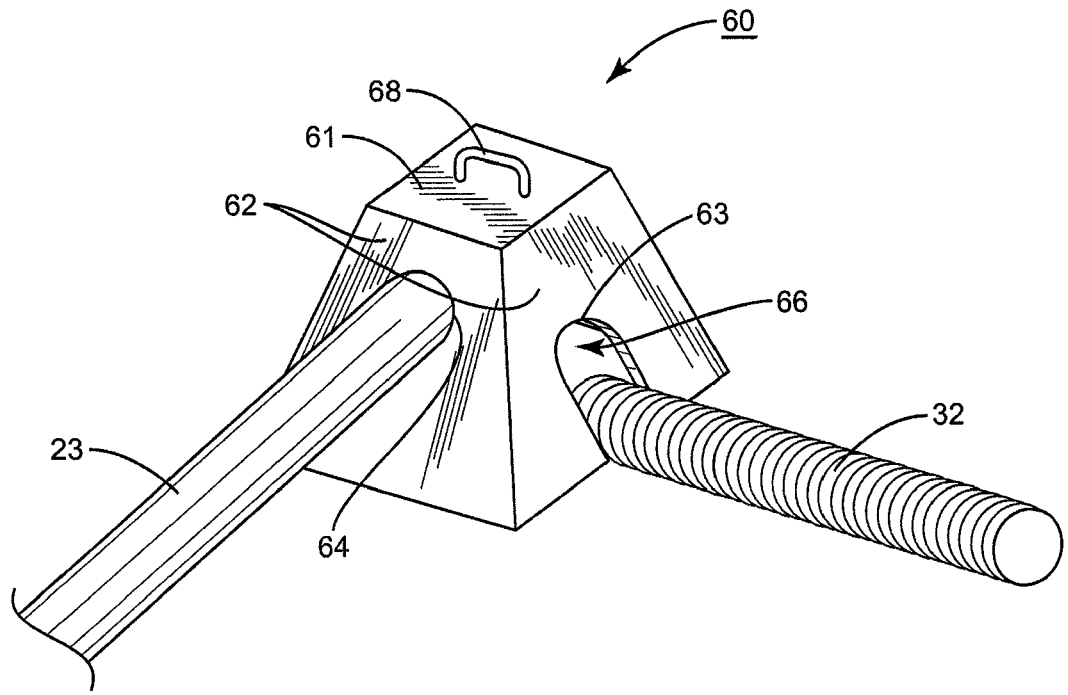
FIGS. 5A and 5B show a perspective view of a wastewater flow diverter showing inlet and outlet pipes.
Figure 5B:
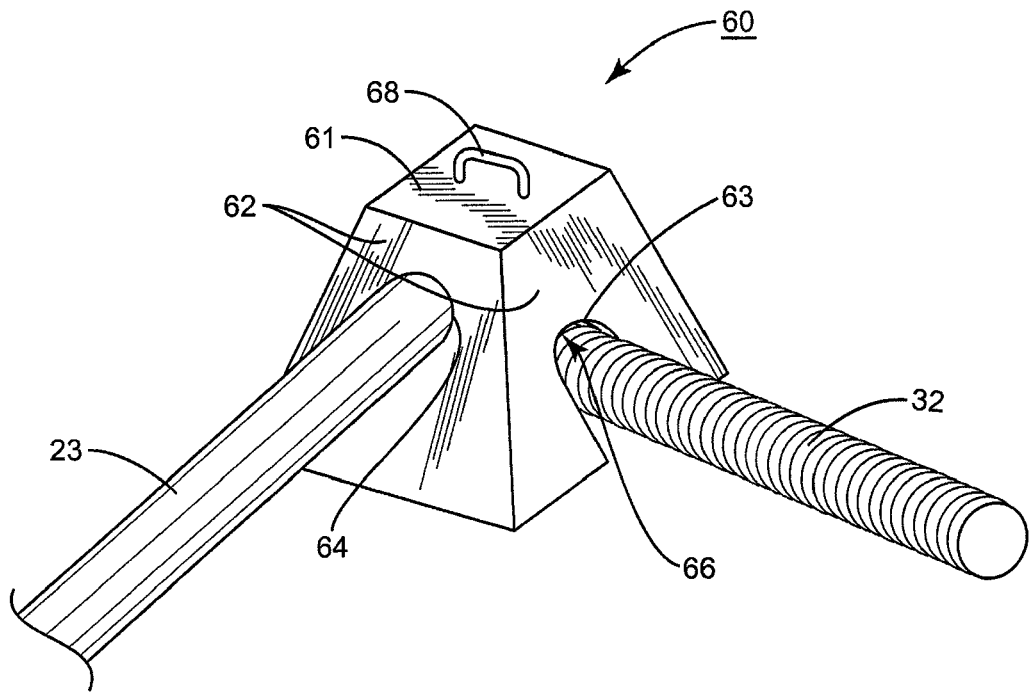
Figure 6:
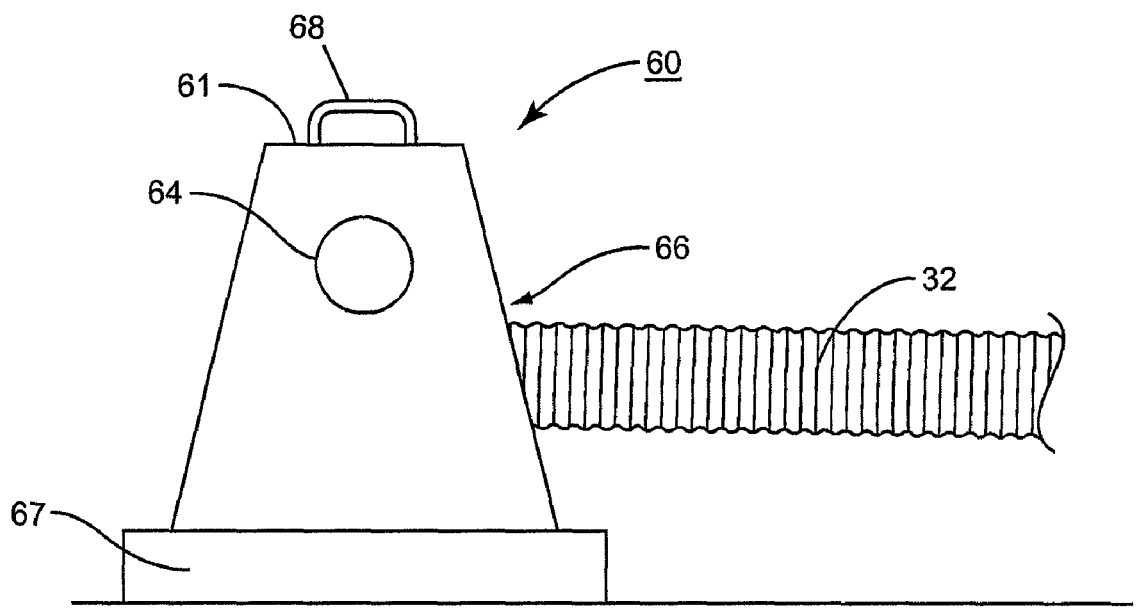
FIG. 6 is a side view of a wastewater flow diverter elevated above a trench to receive a pipe.

An open bottom 65 allows a wastewater flow diverter 60 to accommodate different trench configurations. For example, an installer may position a wastewater flow diverter 60 at the outlet end 25 of trench such that a first opening 63 receives a first trench pipe 22. Where a first trench pipe 22 may be in close contact with the bottom soil of a first trench 20, a gap 66 can be formed as shown in FIG. 5A. FIG. 5B shows a wastewater flow diverter 60 positioned over a first trench pipe 22 where gap 66 is minimal. Gap 66 is minimal where the elevation of the first trench pipe 22 above the bottom of the first trench 20 is about equal to the vertical height (H) of the first opening 63. The wastewater flow diverter 60 gives the land owner or installer flexibility to adapt to reconfigurations of the first trench pipe 22 as the first trench is prepared. For example, this can occur where a first trench pipe 22 has a higher elevation over the first trench 20 bottom than designed. Another example is where the first trench pipe 22 is repositioned as the aggregate 52 and fill dirt 54 are added to a first trench 20. As shown in FIG. 6, a wastewater flow diverter 60 can be placed on height adjustment blocks 67 to receive a first trench pipe 22. Height adjustment blocks can be used where the elevation of a first trench pipe 22 above the bottom soil is greater than the height of the first opening 63.

A second opening 64 can be located on a side of a wastewater flow diverter 60 and can receive a first transport pipe 23 as shown in FIGS. 5A and 5B. A second opening 64 can form an outlet opening, having a perimeter, through which wastewater will travel towards a subsequent trench. Positioned near the top 61 of a wastewater flow diverter 60, a second opening 64 may discharge wastewater 18 that has been accumulated (as described above) into a first transport pipe 23. This discharge occurs as the level of wastewater 18 rises above the bottom portion of the second opening 64 and the top portion of the first opening 63. A portion of the second opening 64 can be positioned on the wastewater flow diverter 60 above a top portion of first opening 63 to facilitating this discharge.

In the embodiment shown in FIGS. 5A and 5B, a first transport pipe 23 may have a cylindrical shape with a hollow inner portion. The second opening 64, circular in shape, may be sized to receive a first transport pipe 23, e.g. have a diameter greater than the diameter $D_2$ of a first transport pipe 23. A second opening 64 may be designed to accommodate any conveyance structure such as a tube, pipe, channel, duct or passage for conveying wastewater 18 from a wastewater flow diverter 60 to the inlet end of a subsequent trench.

A wastewater flow diverter 60 may be modified based on the specific piping system used in the trenches and the general design constraints arising from the septic tank 12 and drainfield 16. Where aggregate 52 covers the bottom soil 58, the width of the base of a wastewater flow diverter 60 may be at least 5 inches. A preferred base width may be between about 10 inches and about 20 inches. Where a wastewater flow diverter 60 will be placed directly on the bottom soil 58 of a first trench 20, its width can be at least about 5 inches; a preferred width can be between about 10 inches and about 18 inches.

A wastewater flow diverter 60 can be constructed either on or off-site. A wastewater flow diverter 60 can be formed as a single unitary piece. Concrete can be used to form the wastewater flow diverter 60. In one embodiment, a wastewater flow diverter 60 formed from concrete can be reinforced with a steel wire. While concrete can be used as a forming material, a wastewater flow diverter 60 can also be formed from thermoplastic or thermoset materials. Processes such as blow molding, injection blow molding, vacuum forming and pressure forming may be used. Polymers can include low-density polyethylene (LDPE), high density polyethylene (HDPE) and high molecular weight-high density polyethylene (HMW-HDPE).

A method of using a wastewater flow diverter 60 is also an aspect of the invention. A land owner or installer can design and build a septic system 10 for a dwelling 8. Evaluating the topography of the landform, availability of space and soil conditions, the designer can first map a septic tank system including the general design for a drainfield 16. Upon excavation of the site for a septic tank 12 and a septic pipe 14, a first 20, second 30, and third trench 40 can be prepared. A septic tank 12 can be installed, attaching a septic pipe 14 to the septic tank 12. A layer of aggregate 52 can be added to a first trench 20. A first trench pipe 22 can be placed in a first trench 20 over the aggregate 52. Additional aggregate 52 can be added to a first trench 20 to cover the first trench pipe 22. The installer may leave a portion of a first trench pipe exposed. Fill dirt 54 can then be added to a first trench 20 up to the surface of the drainfield 16.

A wastewater flow diverter 60 can be positioned over a first trench pipe 22. The open bottom 65 and first opening 63 of the wastewater flow diverter 60 can be placed over a first trench pipe 22 (as shown in FIGS. 5A, 5B and 6). A handle 68 extending upward from the top 61 allows an installer to move and position a wastewater flow diverter 60 as needed. Following the placement of wastewater flow diverter 60 over a first trench pipe 22, a first end of a first transport pipe 23 can be inserted into a second opening 64 of a wastewater flow diverter 60, its second end extending to the second trench 30.

The second trench 30 can be installed in a similar manner to the first. An elbow junction 21 can connect a first transport pipe 23 to a second trench pipe 32. At the outlet end 35 of a second trench 30, a second wastewater flow diverter can be positioned over a second trench pipe 32 so that the open bottom 65 and first opening 63 receive a second trench pipe 32. Where the elevation of a second trench pipe 32 over the bottom soil 58 (or aggregate 52) is lower than the top of a first opening 63, a gap 66 is formed. Following the placement of a second wastewater flow diverter, a second transport pipe 33 can be introduced into a second opening 64, its second end extending to the third trench 40. The third trench 40 can be installed in a similar manner to the first 20 and second 30 trenches.

The inventors contemplate adding additional trenches to an existing septic system 10. This can begin with locating the last or terminal trench in an existing septic system 10. An installer may need to clear a portion of the outlet end of a last trench, exposing a third trench pipe 42. A wastewater flow diverter 60 can then be positioned over a third trench pipe 42 as described above. Where the elevation of a third trench pipe 42 over the bottom soil 58 is higher than the top of a first opening 63 on a wastewater flow diverter 60, height adjustment blocks 67 can be placed on the bottom soil 58 raising the elevation of a wastewater flow diverter 60 to adequately receive a third trench pipe 42. The installer may then introduce a new transport pipe to a wastewater flow diverter 60. The new trench can be constructed in similar manner as the first 20, second 30 and third 40 trenches described above.

The wastewater flow diverter may minimize installer error common to known methods of linking trenches in a septic system 10. The first opening 63, open bottom 65 and the inner volume create sufficient space to receive any trench pipe. The installer can place the wastewater flow diverter over a trench pipe without any modifications or adjustments. Because the wastewater flow diverter 60 is flexible as to receive different pipe shapes, pipe sizes, and pipe elevations over the trench bottom, the adjustments necessary for known methods of linking trench in septic systems are eliminated.

The invention has been described herein in terms of several embodiments and constructions that are considered by the inventors to represent the best mode of carrying out the invention. It will be understood by those skilled in the art that various modifications, variations, changes and additions can be made to the illustrated embodiments without departing from the spirit and scope of the invention. These and other modifications are possible and within the scope of the invention as set forth in the claims.

I claim:

1. A wastewater flow diverter for installation in a septic system including a septic tank, first and second trenches, first and second trench pipes, and a transport pipe, comprising:
   a top;
   first and second sides adjoining and extending downwardly from said top, the top, the sides and at least a partially open bottom forming an inner volume;
   a first opening on the first side for interconnection to a trench pipe the first opening extending upwardly from the partially open bottom;
   a second opening on the second side for interconnection to the transport pipe; and
   wherein the septic tank is interconnected to the first trench pipe and the transport pipe is interconnected to the second trench pipe.

2. The wastewater flow diverter of claim 1, wherein at least a part of the second opening is positioned at a distance farther from the at least partially open bottom than the top of the first opening.

3. The wastewater flow diverter of claim 1, having a fully open bottom.

4. The wastewater flow diverter of claim 1, wherein the top and the side is a single structure.

5. The wastewater flow diverter of claim 1, wherein the first opening is capable of receiving a trench pipe having a height, and the height of the first opening is greater than the trench pipe height.

6. A septic tank system comprising:
   a septic tank;
   first and second trenches, each said trench having a first and second;
   a trench pipe in each said trench, each trench pipe having a first and second end
   a septic pipe connecting the septic tank to the first end of the first trench pipe;
   a transport pipe having a first and second end;
   a flow diverter between the first trench and the second trench, the flow diverter having a top, bottom and at least first and second sides, the sides adjoining and extending downwardly from the top, the top and the sides forming an inner volume that is at least partially open at the bottom, a first opening on the first side, said first opening extending upwardly from the partially open bottom, a second opening on the second side;
   the first opening of the flow diverter placed over and connecting with the trench pipe at the second end of the first trench;
   the first end of the transport pipe inserted into and connected to the second opening of the flow diverter; and
   the second end of the transport pipe connecting to the first end of the second trench.

7. The septic tank system of claim 6, wherein at least part of the second opening is positioned on the second side at a distance farther from the open bottom than the top of the first opening.

8. The septic tank system of claim 6, wherein the flow diverter further comprises a fully open bottom.

9. The septic tank system of claim 6, wherein the top, first side and second sides of the flow diverter form a single structure.

10. The septic tank system of claim 6, wherein the first opening is capable of receiving the trench pipe having a height, and the height of the first opening is greater than the trench pipe height.

11. An apparatus for diverting wastewater in a septic tank system comprising:
    a flow diverter, a first trench and a second trench, a first trench pipe in the first trench and a second trench pipe in the second trench a septic pipe between a septic tank and the first trench pipe the flow diverter between the first and said second trenches, a transport pipe between the flow diverter and the second trench;
    a means for receiving the first trench pipe in the flow diverter the first trench pipe capable of having more than one elevation above the first trench; and
    a means for accumulating wastewater in said flow diverter and passing the wastewater into the transport pipe.

12. The apparatus of claim 11, wherein the flow diverter comprises a single structure.

13. The apparatus of claim 11, wherein the flow diverter comprises a partially open bottom.

14. The apparatus of claim 11, wherein the flow diverter comprises an open bottom.

15. The apparatus of claim 11, wherein the flow diverter comprises a means for positioning the flow diverter in a first trench, said flow diverter capable of receiving the trench pipe and the transport pipe.

16. The apparatus of claim 11, wherein a transferring means comprises wastewater flowing to the second trench through the outlet opening on the flow diverter, the outlet opening positioned a side of the flow diverter to discharge wastewater accumulating in the flow diverter.

* * * * *